Nov. 11, 1930.  K. SIXMA  1,781,199
FITTING FOR ELECTRICAL CONDUITS
Filed May 7, 1926  2 Sheets-Sheet 1
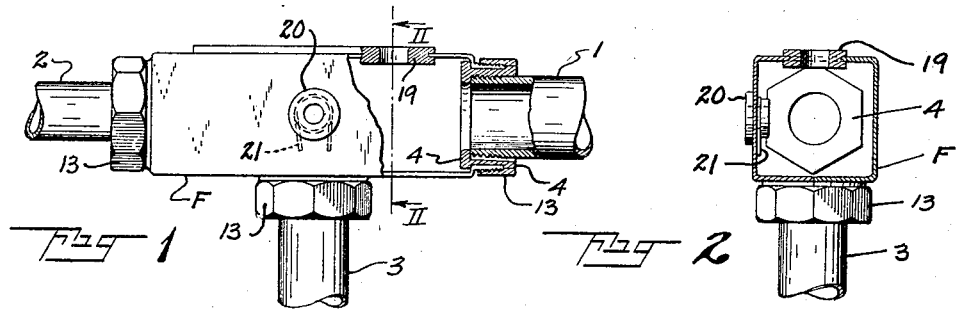
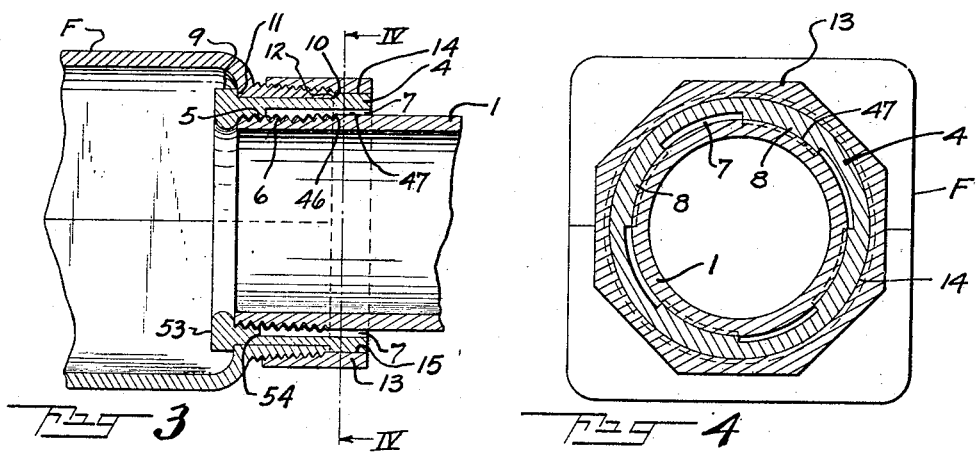
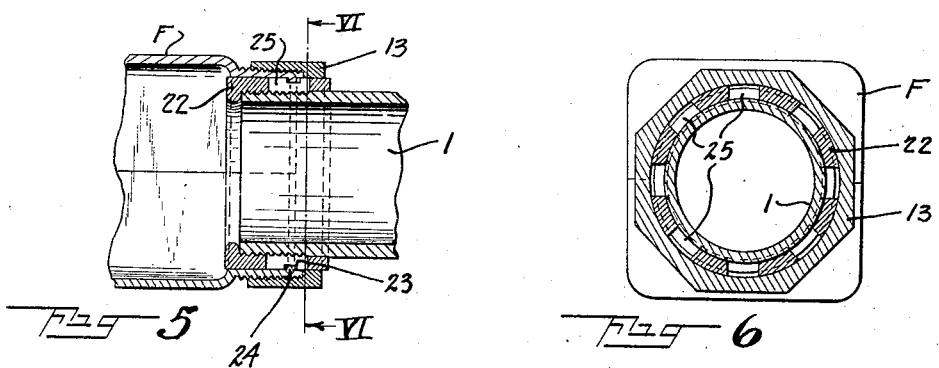
INVENTOR
Klaas Sixma
BY
Lyman E. Dodge
ATTORNEY Nov. 11, 1930.    K. SIXMA    1,781,199
FITTING FOR ELECTRICAL CONDUITS
Filed May 7, 1926    2 Sheets-Sheet 2
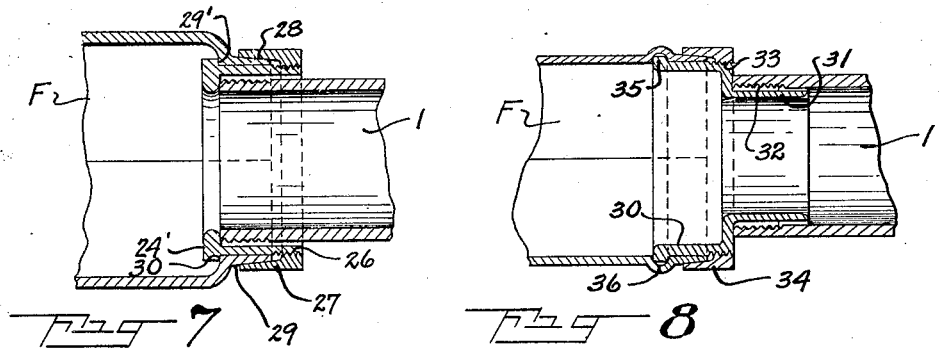
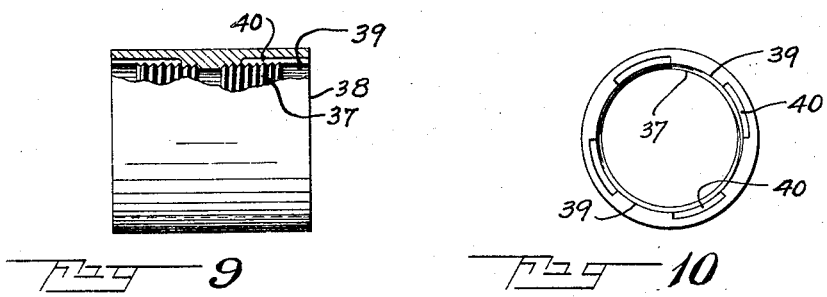
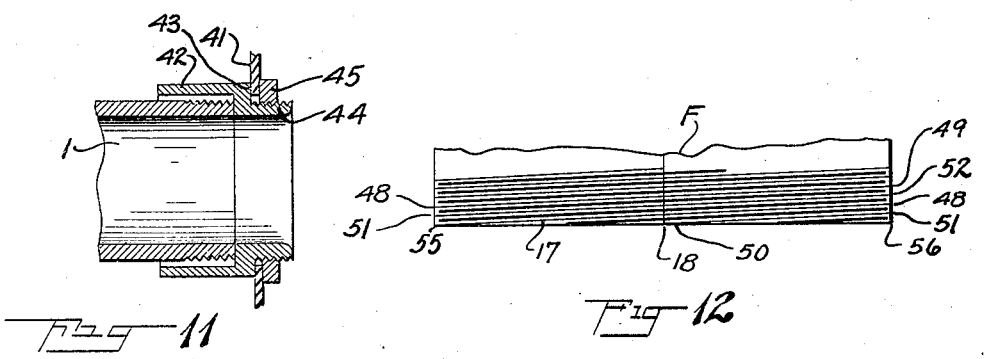
INVENTOR
Klaas Sixma
BY
Lyman E. Dodge
ATTORNEY Patented Nov. 11, 1930

1,781,199

UNITED STATES PATENT OFFICE

KLAAS SIXMA, OF MONTCLAIR, NEW JERSEY

FITTING FOR ELECTRICAL CONDUITS

Application filed May 7, 1926. Serial No. 107,314.

This invention relates to fittings and especially to fittings for electrical conduits through which insulated wires are passed.

The principal object of this invention is to provide a means for conveniently attaching a fitting to the ends of conduits regardless of whether those conduits are provided with threaded ends or not.

A further object of the invention is to provide a fitting which may be divided on a center line and the two halves be exactly alike, so that the different kinds of parts to be kept in stock will be minimized.

Other objects and advantages of the invention will appear as the description of the particular physical embodiments selected to illustrate the invention progresses and the novel features of the invention will be particularly pointed out in the appended claims.

In describing the invention in detail and the particular physical embodiments selected to illustrate the invention, reference is had to the accompanying drawings, wherein I have illustrated particular preferred physical embodiments of my invention, and wherein like characters of reference designate corresponding parts throughout the several views, and in which:

Figure 1 is a view partly in plan and partly in section showing one form of my improved fitting and the means for connecting the same to a conduit. Fig. 2, is a cross sectional view taken on the plane indicated by the line II—II, Fig. 1, viewed in the direction of the arrows at the ends of the line; Fig. 3, is a detail longitudinal sectional view indicating the construction of the connecting means for the fitting; Fig. 4, is a cross sectional view on the plane indicated by the line IV—IV of Fig. 3, viewed in the direction of the arrows at the ends of the line; Fig. 5, is a longitudinal sectional detail view of a modification of the device as shown in Fig. 3; Fig. 6, is a cross sectional view on the plane indicated by the line VI—VI of Fig. 5, viewed in the direction of the arrows at the ends of the line; Fig. 7, is a longitudinal sectional view of a modified form of the means as shown in Fig. 3; Fig. 8, is a cross sectional view of another modified form; Fig. 9 is a view partly in plan and partly in section, showing a form of coupling embodying applicant's invention; Fig. 10, is an end view of the device Fig. 9; Fig. 11, is a longitudinal sectional view indicating a method of connecting a conduit to what is known as a wall box; Fig. 12, is a view illustrating how the parts of a two part fitting may be made identical.

In Fig. 1, I have shown a conduit 1, a conduit 2 and a conduit 3 and in addition a fitting designated generally by F, which connects the conduits.

The fitting F, for convenience, should be made in two duplicate parts and in general is a hollow elongated prism with reduced ends and should be so constructed that access may be had to the interior thereof without disturbing the position of the conduits 1, 2 and 3. It is common to make and use a fitting which may connect two, three or four conduits and which is so constructed that access may be had to the interior thereof without disturbing the position of the conduits. These prior art fittings are however, in general, composed of two parts held together by nuts and bolts. There are fittings such as those shown in my prior patents as No. 1,108,259, dated August 25, 1914, and No. 1,229,665, dated, June 12, 1917 in which the construction is such that bolts and nuts are not used, but this prior construction of mine of which the present invention is an improvement, in some forms necessitates an extra long thread upon the conduit. In the present invention, the thread required upon the conduit is no longer than is usual with other types of fittings and in addition, there is provided in the present invention a means whereby a thread may be made upon the conduit by means of one of the parts of the fitting.

4 designates what I will term a bushing or annular member. This bushing is provided with an internal thread designated 5 which will interfit with the threads 6 of a conduit as 1, so that the bushing 4 may be screwed onto the end of a conduit as shown in the figures. I preferably make the threads 5 of such size that they will not completely fill the threads 6 of the conduit 1 if that conduit is formed with what is known as a standard thread for its diameter.

The bushing 4 as shown by Figs. 3 and 4, is formed with a plurality of cut out portions 7. These cut out portions are preferably somewhat equally spaced and are separated by segments or portions as 8 which are substantially of a proper internal bore to properly, when provided with a thread, engage with a thread as 6 upon a particular conduit as 1. If a conduit as 1 is threaded on the end, then bushing 4 may be directly screwed thereon, but if the conduit is not threaded, the bushing may nevertheless be screwed on. In such case the segment portions 8 will act as a former of a thread on the conduit. In fact they will act like a die the chips lodging in the cut away or chip receiving spaces. I do not, however, have the cut away portions extend to the face 53 of the bushing, stopping them about at the point 54, so that the threads of the bushing and the conduit tightly and practically completely interfit for at least a short distance so as to prevent water entering.

In order that the bushing will properly position itself when being screwed onto an unthreaded conduit, the threads in the bushing are carried only to the line 46, Fig. 3. Beyond this point the internal bore of the bushings is the same as the diameter of the pipe, so that a centering surface 47 is formed in the bushing.

After bushings as 4 are placed on the ends of each of the conduits as 1, 2 and 3, the fitting proper F may be put in place, being positioned accurately by the coacting spaced facing shoulders 9 and 10 on the bushing with the shoulders 11 and 12 respectively of the fitting. By means of these co-acting shoulders all parts are held in perfect alignment and rigidly in position.

In order to complete the structure, a lock nut or clamping ring or annulus 13 is screwed onto the fitting, clamping the two parts of the fitting together and in place in contact with the shoulders on the bushing. This clamping ring has an external periphery in such form that an ordinary wrench may be applied thereto preferably having flat faces but not necessarily so. In the form shown, it is octagonal. The inner surface of the annulus is formed with a bearing or centering surface 14 which meets with and bears upon the bearing or centering surface 15 of the bushings thereby exactly centering the annulus.

I preferably construct the fitting F and the annulus 13 with co-operating tapered threads of what is known as the double form, that is, there are really two independent threads or helices formed on both the fitting and the annulus.

Fig. 12, is a development of the threaded similar ends of an upper and lower part of a fitting. The lower part of the fittings is represented by the portion from 18 to 55. The upper part of the fitting is represented by 56 to 18, but the line 56 is the same parting line as shown by 55, and 18 designates the other parting line. It will be seen, therefore, that thread 17 proceeds to 48 then tracing the thread from the left hand end the thread proceeds to 49 and so on. The second thread starts at 50 and proceeds to 51 and then starting from the same point 51 at the left of the view proceeds to 52. By this expedient both the upper and the lower half of a fitting may be used interchangeably. That is the upper portion may be used for the lower and vice versa. Such a construction decreases cost of dies, the number of parts to be kept in stock and obviates loss of time in matching upper and lower halves. To take full advantage of this feature the thread in the annulus 13 is also made double.

If outlets from the fitting are desired then split or whole insulating bushings as 19, Fig. 2, may be used or bushings as 20, held in place by a spring wire 21.

Instead of the construction as shown by Figs. 1 to 4 inclusive, I may build my bushing 22 as shown in Fig. 5, that is, a groove 23 is formed in the bushing and an annular rib 24 may be formed on the fitting F to lie in such groove 23. By this means the fitting is accurately positioned, but the shoulders 9 and 10 of bushing 4 are dispensed with, their equivalent being present in the shoulders formed by the groove.

In Fig. 6, I have shown cut away portions as 25 corresponding in function to cut away portions 7 of Fig. 4. In Fig. 6, however, the material is removed to and through the surface of the bushing, so that chips fall therethrough and away from the finished construction. This construction may of course be used either with bushing 22 or bushing 4.

In Fig. 7, I have shown still another construction in that the fitting F proper has no thread thereon. The bushing 24 is provided with an external thread 26 co-operating with an internal thread on the annulus 27 and the sloping surfaces 28 and 29 on the annulus 27 and the fitting F respectively, together with the co-operating shoulders 29 and 30, securely hold the fitting in place.

In Fig. 8, I have shown still another type. The bushing 30 is formed with a portion 31 of a diameter proper for entering a conduit and has formed on the exterior surface the thread 32 which engages with a thread formed on the inside of the conduit or in being screwed in forms such thread. The bushing also has an external thread 33 which co-operates with a thread on the interior of an annulus 34 formed like the annulus 27 of Fig. 7 and co-operating with the fitting F in the same way. In the form shown in Fig. 8, however, the longitudinal positioning of the fitting is attained by providing the shoulder 35 on the bushing and a groove 36 in the fitting.

In Fig. 9, I have shown a coupling embodying the self threading principle of my bushing 4 of Fig. 1. The thread 37 of which is not carried quite to the end of the coupling. Between 37 and 38 the centering faces 39 are formed. The couplings are provided with the chip receiving spaces 40 just as in the bushing 4, Fig. 1, or it may be constructed like the bushing 22 with cut through portions 25.

In Fig. 11, I have illustrated the application of my bushing to the connection of a threaded or unthreaded conduit to a box. The wall of the box is designated 41. The bushing 42 has a shoulder 43 which abuts one side of the wall 41 of the box. The bushing 42 also has a threaded extension 44 extending into the box and on this threaded extension works a clamping nut 45 which clamps against the inside of the wall of the box.

Applicant contemplates so constructing the fittings and bushings that one fitting may be applicable for use with several different size conduits. This result is attained by making the external dimensions of several bushings the same, but the internal dimensions different so that a particular size conduit will be fitted. Applicant may in this way use, say, one fitting for three or more different size conduits as, say, $\frac{1}{2}''$, $\frac{1}{4}''$ and $1''$ by using the proper one of three different bushings. Applicant's invention lends itself readily to such procedure and results in a great saving in the number of parts which must be kept in stock.

It is of course to be understood that in those cases where the bushing is to be used to form a thread, the bushing will be given the most advantageous form and be made of material, preferably, such as steel hardened and tempered, to suit the work which it has to perform.

Although I have particularly described the construction of several physical embodiments of my invention and explained the operation and principle thereof, nevertheless, I desire to have it understood that the forms selected are merely illustrative but, do not exhaust the possible physical embodiments of the idea of means underlying my invention.

What I claim as new and desire to secure by Letters Patent of the United States is:

1. A bushing of general annular shape formed internally with a thread and having cut away portions transverse to the thread for receiving chips and a centering surface at the outer end thereof for bearing on a conduit and externally with means for receiving and positioning a fitting and a centering surface for an annulus adapted to extend over said fitting.

2. As an article of manufacture, as a wire conduit connecting means a device of general annular shape formed internally with a thread interrupted by symmetrically arranged longitudinal cut away chip receiving spaces and a centering surface at the outer end thereof adapted to engage the periphery of a conduit, and externally with a plurality of spaced facing shoulders and a centering surface for a clamping annulus.

KLAAS SIXMA.